(No Model.)
H. H. TRENOR.
TOOL HANDLE.
No. 308,934. Patented Dec. 9, 1884.
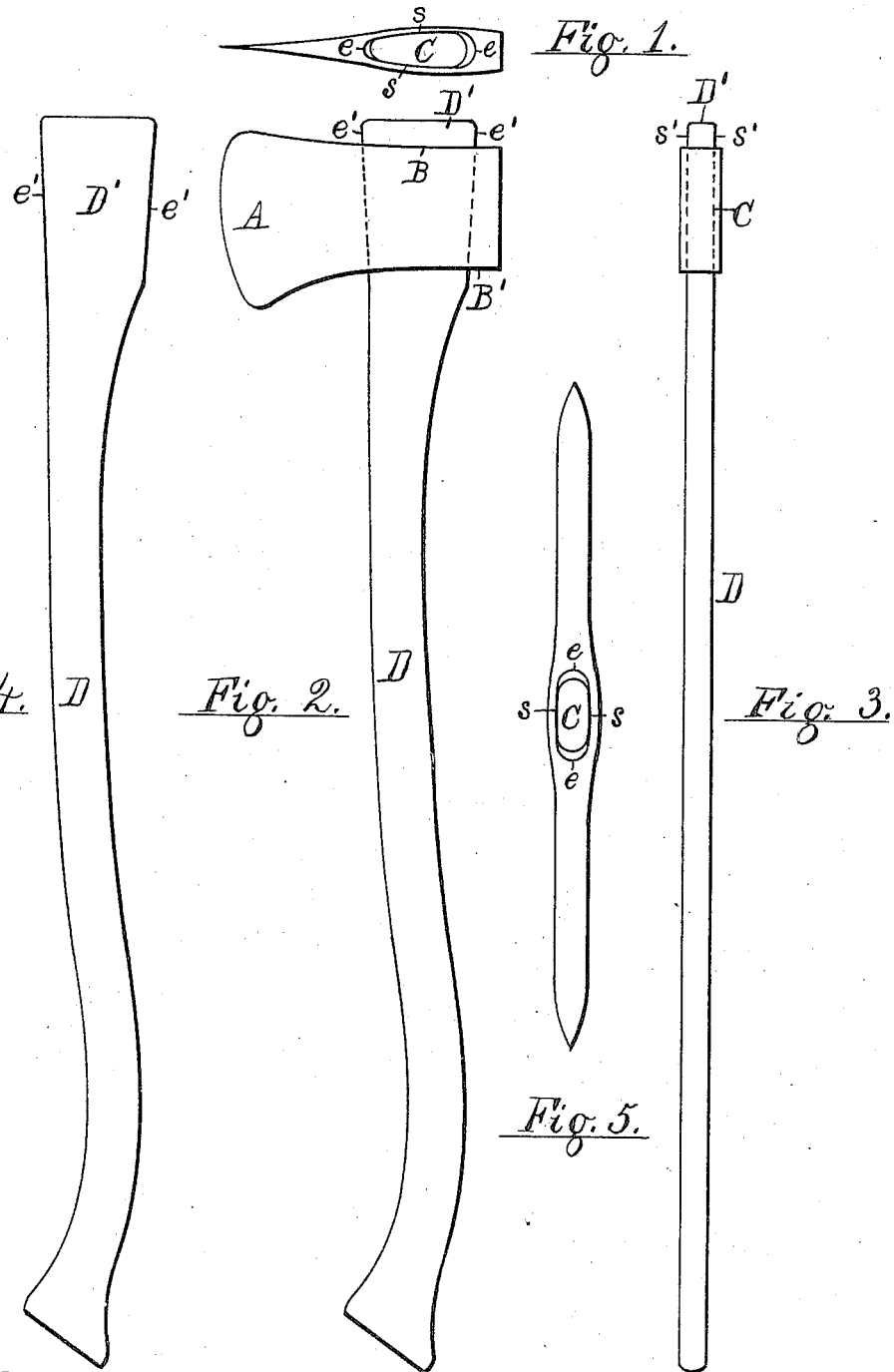

UNITED STATES PATENT OFFICE.

HENRY H. TRENOR, OF NEW YORK, N. Y.

TOOL-HANDLE.

SPECIFICATION forming part of Letters Patent No. 308,934, dated December 9, 1884.

Application filed May 2, 1884. (No model.)

*To all whom it may concern:*

Be it known that I, HENRY H. TRENOR, a citizen of the United States, residing in the city, county, and State of New York, have invented certain new and useful Improvements in Tool Handles and Eyes, fully described and represented in the following specification and the accompanying drawings, forming a part of the same.

This invention consists in a handle having a head formed with parallel sides and tapering edges, to fit an eye having parallel sides and tapering ends, as claimed by me in another patent application, No. 125,692, pending simultaneously herewith.

The construction will be understood by reference to the annexed drawings, in which Figure 1 is a plan of an ax-head to which the invention is shown as applied. Fig. 2 is a side view of the ax complete. Fig. 3 is an edge view of such ax. Fig. 4 is a side view of the handle alone; and Fig. 5 is a plan of a mining-pick head with an eye of somewhat different shape, but adapted to use with the handle claimed herein.

A is the bit of the ax-head; C, the eye; B, the top of the eye; B', the bottom of the eye; s s, the sides of the eye; e e, the ends of the eye; D, the haft of the handle, and D' the head of the handle. The sides of these eyes (lettered s s) are made parallel with one another, while the ends e e are tapered or widened toward the top of the eye at B, so that the handle may be inserted therein from the top and retained therein by its widened edges e'. The handle-head D' has parallel sides s', so as to be of equal thickness at the top and bottom, as shown in Fig. 3, but is widened out at its edges e' toward the upper end, to exactly fit the eye, and its haft D is made of any shape and size that will pass through the eye C from the upper side, B. The hole through the eye may be made of any desired shape, provided it has parallel sides and taper ends. In the ax-head in Fig. 1 the eye is made of egg form, to coincide with the wedge shape of the tool-head to which it is applied, while in the pick-head shown in Fig. 5 the eye is of an oblong shape, with similar rounded ends to match the similar extremities of the tool-head. In either case the taper is confined to the ends of the eye, as an increase of thickness would injuriously affect the usefulness of either an ax or a mining-pick, such tools being designed to crowd into narrow crevices when in use.

I have not claimed herein, broadly, a handle having a head with two parallel and two tapering sides, as I intend to claim a modification of such a handle in another application before the issue of any patent for the present invention; neither do I claim in my present application the form of eye shown herein, as I have claimed the same in my application No. 125,692; but

What I claim herein is—

The handle herein shown and described, having a head, D', with parallel sides s' and tapering edges e', and having its haft D made as small as the bottom end of its head, so as to pass through an eye that will retain the head, all substantially as and for the purpose set forth.

In testimony whereof I have hereunto set my hand in the presence of two subscribing witnesses.

HENRY H. TRENOR.

Witnesses:
C. C. HERRICK,
THOS. S. CRANE.